US010258994B2

(12) United States Patent
Cooke

(10) Patent No.: US 10,258,994 B2
(45) Date of Patent: Apr. 16, 2019

(54) METHOD AND APPARATUS FOR PROCESSING A USED MATTRESS

(71) Applicant: MADDISON MORGAN & BAILEY LIMITED, Hong Kong (HK)

(72) Inventor: Philip Andrew Cooke, New South Wales (AU)

(73) Assignee: MADDISON MORGAN & BAILEY LIMITED, Hong Kong (CN)

( * ) Notice: Subject to any disclaimer, the term of this patent is extended or adjusted under 35 U.S.C. 154(b) by 552 days.

(21) Appl. No.: 14/422,030

(22) PCT Filed: Aug. 16, 2013

(86) PCT No.: PCT/AU2013/000905
§ 371 (c)(1),
(2) Date: Feb. 17, 2015

(87) PCT Pub. No.: WO2014/026237
PCT Pub. Date: Feb. 20, 2014

(65) Prior Publication Data
US 2015/0217300 A1    Aug. 6, 2015

(30) Foreign Application Priority Data
Aug. 17, 2012  (AU) ................................ 2012903549

(51) Int. Cl.
*B02C 19/00* (2006.01)
*B29B 17/02* (2006.01)
(Continued)

(52) U.S. Cl.
CPC ................ *B02C 19/00* (2013.01); *B09B 5/00* (2013.01); *B26F 3/004* (2013.01); *B29B 17/02* (2013.01);
(Continued)

(58) Field of Classification Search
CPC ........... B02C 19/00; B09B 5/00; B29B 17/04; B29B 17/02
See application file for complete search history.

(56) References Cited

U.S. PATENT DOCUMENTS

2008/0270157 A1* 10/2008 Read ...................... G06Q 30/06
705/1.1
2009/0293431 A1* 12/2009 Andria ................... B65B 5/045
53/438

(Continued)

FOREIGN PATENT DOCUMENTS

AU    2010100054 A4    3/2010
DE       8713472 U1    1/1988
(Continued)

OTHER PUBLICATIONS

Barbara Nelles, Matress recycling, Feb. 2010.*
(Continued)

*Primary Examiner* — Faye Francis
(74) *Attorney, Agent, or Firm* — AKC Patents, LLC; Aliki K. Collins

(57) ABSTRACT

Method and apparatus for deconstructing, cutting, shredding or disintegrating a mattress, sofa, car seat or similar items with steel or metal sub frames by the use of high pressure water jets whereby the mattress, sofa, car seat or the like is compressed and then deconstructed while compressed by the use of high pressure water jets.

19 Claims, 7 Drawing Sheets

(51) Int. Cl.
*B26F 3/00* (2006.01)
*B29B 17/04* (2006.01)
*B09B 5/00* (2006.01)
B29L 31/58 (2006.01)
B29L 31/00 (2006.01)

(52) U.S. Cl.
CPC .......... *B29B 17/04* (2013.01); *B29B 17/0412* (2013.01); *B29B 2017/0428* (2013.01); *B29L 2031/58* (2013.01); *B29L 2031/751* (2013.01); *Y02W 30/622* (2015.05); *Y02W 30/625* (2015.05)

(56) References Cited

U.S. PATENT DOCUMENTS

2010/0319301 A1* 12/2010 Petrolati ............... B65B 63/024
  53/121
2011/0168818 A1  7/2011 Verri
2013/0081209 A1  4/2013 Young et al.

FOREIGN PATENT DOCUMENTS

| | | | |
|---|---|---|---|
| DE | 20205064 U1 | 7/2002 | |
| FR | 2171727 A1 | 7/1999 | |
| FR | 2773727 A1 | 7/1999 | |
| JP | H0810639 A | 1/1996 | |
| JP | 2002273353 A | 9/2002 | |
| JP | 2006136914 * | 6/2006 | ............... B30B 9/00 |
| JP | 2009202109 * | 9/2009 | ............... B09B 3/00 |
| WO | 2011006229 A1 | 1/2011 | |

OTHER PUBLICATIONS

International Search Report, Australian Patent Office, dated Nov. 13, 2013.
International Preliminary Report on Patentability, Australian Patent Office, dated Nov. 26, 2014.
European Search Report, dated Aug. 22, 2016.

* cited by examiner

METHOD AND APPARATUS FOR PROCESSING A USED MATTRESS

This application claims the benefit of international PCT application Serial No. PCT/AU2013/000905 filed on Feb. 17, 2015 and entitled "A METHOD FOR PROCESSING A USED MATTRESS, A METHOD FOR COMPRESSING A USED MATTRESS, COMPRESSION APPARATUS FOR COMPRESSING A USED MATTRESS, DECONSTRUCTION APPARATUS FOR DECONSTRUCTING A MATTRESS, INFUSION APPARATUS FOR INFUSING A MATTRESS, INTEGRITY TESTING APPARATUS FOR TESTING THE INTEGRITY OF A MATTRESS AND SILAGE BIN FOR STORAGE OF A MATTRESS", which is commonly assigned and the contents of which are expressly incorporated herein by reference.

This application also claims the benefit of Australian provisional application Serial No. 2012903549 filed on Aug. 17, 2012 and entitled "RECYCLING ASSEMBLY FOR COMPOSITE ITEMS", which is commonly assigned and the contents of which are expressly incorporated herein by reference.

FIELD OF THE INVENTION

The present invention relates to recycling technology and in particular to a method for processing a used mattress, a method for compressing a used mattress, compression apparatus for compressing a used mattress, deconstruction apparatus for deconstructing a mattress, infusion apparatus for infusing a mattress, integrity testing apparatus for testing the integrity of a mattress and silage bin for storage of a mattress.

The invention has been developed primarily for use in processing use mattresses and will be described hereinafter with reference to this application. However, it will be appreciated that the invention is not limited to this particular field of use and may be equally applicable for processing other used items such as sofas, car seats and the like, especially those comprising steel or other metal type subframes.

BACKGROUND

The present invention seeks to provide a method for processing a used mattress, a method for compressing a used mattress, compression apparatus for compressing a used mattress, deconstruction apparatus for deconstructing a mattress, infusion apparatus for infusing a mattress, integrity testing apparatus for testing the integrity of a mattress and silage bin for storage of a mattress, which will overcome or substantially ameliorate at least some of the deficiencies of the prior art, or to at least provide an alternative.

The various recycling technology is known in the art. Specifically, publication DE 20205064 U discloses apparatus for crushing waste and describes a rotating drum shuttle in combination with high-pressure water jets and fangs for deconstructing mattresses and the like.

Furthermore, many recycling technologies relate to reclaiming rubber and other constituents from used tyres. These recycling technologies include publications FR 2773727 A1 describing a conveyor system for conveying car tyres prior to high-pressure deconstruction, WO 1992/015438 A1 describing reclaiming constituent materials from used tyres comprising stripping tread from a type and then employing high-pressure jets to strip the residual components from the reinforcement layers, US 2011/0168818 describing a tyre recycling plants comprising a plurality of workstations and U.S. Pat. No. 5,115,983 describing the recycling of scrap vehicle tyres so as to produce the shredded rubber material in useful sizes.

However, the existing arrangements, including those described above are not particularly suited when it comes to processing used mattresses and similar composite items, especially those comprising steel subframes.

Specifically, the technical challenges posed by processing mattresses, either for deconstruction or for resale relate to the volumous nature of mattresses and the like, resulting in inefficiencies in the transportation and deconstruction thereof. Generally, on account of the volumous nature of mattresses it is difficult to transport the mattresses in a cost-effective manner or to destroy the mattresses in an efficient manner given their volume and low density.

Furthermore, use mattresses may comprise water which poses problems in the handling, constipation and deconstruction thereof.

Furthermore, use mattresses may comprise contaminants which may pose OH&S hazards during the handling thereof.

As such, mattresses are generally left in landfills and are not processed for recycling or resale.

It is to be understood that, if any prior art information is referred to herein, such reference does not constitute an admission that the information forms part of the common general knowledge in the art, in Australia or any other country.

SUMMARY

According to one aspect, there is provided a method for processing used mattress in a compressed state. As alluded to above, existing recycling technologies, though while being suited for car tyres and the like, are not especially suited for volumous items such as mattresses and the like. As will become apparent from the description hereunder, an embodiment described herein comprises the compression of mattresses, including up to 10 fold compression factors, so as to provide efficiencies in the transportation of the mattresses, such as between processing depots and the like, the removal of water therein, and also in the deconstruction of the mattress, wherein the deconstruction of the mattresses in a compressed state affords advantages in greater control of the deconstruction process, energy efficiency, and lower water usage.

According to one aspect, there is provided a method for processing a used mattress, the method comprising a compression stage comprising compressing the mattress into a compressed state; and a deconstruction stage where the mattress is deconstructed using high-pressure water jets.

Preferably, the compression stage comprises compressing the mattress at least by a factor of 5.

Preferably, the compression stage comprises compressing the mattress at least by a factor of 10.

Preferably, the compression stage further comprises maintaining the compressed state of the mattress using an airtight seal.

Preferably, the compression stage further comprises maintaining the compressed state of the mattress using strapping.

Preferably, the compression stage comprises bagging the mattress

Preferably, bagging the mattress comprises provision of on airtight seal.

Preferably, bagging the mattress comprises pre-compression provision of bagging and post-compression provision of an airtight seal.

Preferably, the compression stage comprises applying a compressive force to the mattress using a mechanical actuator.

Preferably, the mechanical actuator comprises a press plate.

Preferably, the mechanical actuator comprises at least one of hydraulic and pneumatic rams.

Preferably, the mechanical actuator is adapted to apply a predetermined amount of pressure.

Preferably, the mechanical actuator is controlled in accordance with at least one characteristic of the mattress.

Preferably, the at least one characteristic comprises at least one dimension of the mattress.

Preferably, the compression stage comprises creating a pressure differential.

Preferably, creating the pressure differential comprises creating a vacuum.

Preferably, at least some of any water within the mattress is removed.

Preferably, the dewatering comprises squeezing.

Preferably, the squeezing comprises using a squeeze roller.

Preferably, the squeeze roller is adapted for applying a set amount of pressure.

Preferably, the squeeze roller is configured in accordance with at least one characteristic of the mattress.

Preferably, the at least one characteristic comprises a determined water content of the mattress.

Preferably, at least one characteristic of the mattress is tested.

Preferably, the at least one characteristic comprises at least one of: at least one dimension, water content, internal structure, mattress type, visual characteristic and contaminant.

Preferably, the contaminant comprises at least one of pathogen and macroscopic flora.

Preferably, the integrity testing stage further comprises provision of integrity testing results.

Preferably, provision of the integrity testing results comprises transmitting the integrity testing results across a data network.

Preferably, provision of the integrity testing results comprises encoding the integrity testing results on the mattress.

Preferably, the integrity testing results are adapted for use by a subsequent processing apparatus.

Preferably, the subsequent processing apparatus comprises at least one of a chemical infusion apparatus and a deconstruction apparatus.

Preferably, the integrity testing stage further comprises choosing between reuse and deconstruction in accordance with the integrity testing results.

Preferably, the method further comprises a transportation stage between the compression stage and the deconstruction stage.

Preferably, the transportation stage comprises a loading stage comprising inserting the mattress into a silage bin in the compressed state and adjacent at least one other mattress.

Preferably, the loading stage comprises inserting the mattress laterally and atop and adjacent bottom at least one other mattress.

Preferably, the silage bin is a three sided silage bin.

Preferably, inserting the mattress laterally comprises configuring the height of insertion in accordance with the position of the atop an adjacent bottom at least one other mattress.

Preferably, the silage bin is maneuvered atop an air cushion.

Preferably, the deconstruction stage comprises deconstructing the mattress while the mattress is in a compressed state.

Preferably, the deconstruction stage comprises deconstructing the mattress in accordance with at least one characteristic of the mattress.

Preferably, the at least one characteristic is received via a data network.

Preferably, the at least one characteristic is read from an encoding on the mattress.

Preferably, the at least one characteristic is determined from the mattress during the deconstruction stage.

Preferably, the at least one characteristic comprises at least one of: mattress spring type structure and at least one mattress dimension.

Preferably, the deconstruction stage comprises separating the mattress into constituent materials.

Preferably, the constituent materials comprises a wireframe spring structure.

Preferably, the wireframe spring structure is slit.

Preferably, the wireframe spring structure is baled or rolled.

Peripherally, the method further comprises an infusion stage comprising infusing the mattress with at least one chemical.

Preferably, the infusion stage comprises a vacuum infusion.

Preferably, the infusion stage comprises infusion state determination.

Preferably, the infusion stage comprises bagging.

Preferably, the infusion stage comprises further compression of the mattress.

Preferably, the at least one chemical comprises at least one of disinfectant, insecticide, fungicide, flame retardant, perfume and colorant.

Preferably, at least a portion of the constituent materials is recycled.

According to another aspect, there is provided a method for compressing a used mattress, the method comprising squeezing water from the mattress; and compressing the mattress into a compressed state.

Preferably, the method further comprises determining a water level, and squeezing the mattress in accordance with a determined water level.

Preferably, the method further comprises bagging the mattress.

Preferably, the method further comprises a transportation stage where the mattress is transported in a compressed state.

According to another aspect, there is provided a compression apparatus for compressing a used mattress, the compression apparatus adapted for compressing the used mattress into a compressed state.

Preferably, the compression apparatus comprises a mechanical actuator for compressing the mattress.

Preferably, the mechanical actuator comprises a press plate.

Preferably, the mechanical actuator comprises hydraulic rams.

Preferably, the mechanical actuator is adapted to apply a predetermined amount of pressure.

Preferably, the mechanical actuator is controlled in accordance with at least one characteristic of the mattress.

Preferably, the at least one characteristic comprises at least one dimension of the mattress.

Preferably, the compression stage comprises creating a pressure differential.

Preferably, creating the pressure differential comprises bagging the mattress and creating a vacuum.

Preferably, the compression apparatus further comprises a conveyor for manoeuvring the mattress to the mechanical actuator.

Preferably, the compression apparatus comprises dewatering means to remove at least some of any water contained within the mattress.

Preferably, the dewatering means comprises a squeeze roller.

Preferably, the compression apparatus further comprises a pre-compression bagging means adapted to bag the mattress.

Peripherally, the compression apparatus further comprises a post compression airtight seal provision means.

Preferably, the airtight seal provision means comprises at least one of plastic film heat knives and a resealing mechanism.

Preferably, the deconstruction apparatus is adapted to deconstruct the mattress when the mattress is in a compressed state.

Preferably, the water cutting means comprises a water cutting head comprising at least one waterjet adapted to cut the mattress in a cutting zone.

Preferably, the deconstruction apparatus is adapted to deconstructing mattress in accordance with at least one characteristic of the mattress.

Preferably, the at least one characteristic comprises the type of internal spring structure of the mattress.

Preferably, the bottom grisly bar is configured to open or close in accordance with the internal spring structure of the mattress.

Preferably, the deconstruction apparatus further comprises a magnetic particle conveyor adapted to attract and convey magnetic components from the mattress.

Preferably, the deconstruction apparatus further comprises a mattress compressor located at an infeed of the deconstruction apparatus.

Preferably, the deconstruction apparatus further comprises a conveyor adapted to convey the mattress to the water cutting means.

Preferably, the deconstruction apparatus further comprises a slitting saw adapted to slit a wireframe spring structure of the mattress.

Preferably, the slitting saw is located at an outfeed of the deconstruction apparatus.

Preferably, the deconstruction apparatus further comprises baling means adapted to bale a wireframe spring structure of the mattress into a bale.

Preferably, the bailing means comprises retentioner provision means adapted to provide a retentioner for the bail.

Preferably, the retentioner provision means is adapted to provide the retentioner between layers of the bale.

Preferably, the retentioner comprises sheeting.

Preferably, the sheeting comprises paper.

Preferably, the bailing means further comprises strapping means adapted to strap the bail.

According to another aspect, there is provided an infusion apparatus for infusing a mattress adapted for infusing the mattress with at least one chemical.

Preferably, the infusion apparatus is adapted to infuse the mattress using a vacuum.

Preferably, the infusion apparatus comprises a vacuum pump.

Preferably, the infusion apparatus is adapted to determine the infusion state of the at least one chemical.

Preferably, the infusion apparatus comprising bagging means.

Preferably, the infusion apparatus comprises a mattress compression means.

Preferably, the at least one chemical comprises at least one of disinfectant, insecticide, fungicide, flame retardant, perfume and colourant.

Preferably, the integrity testing apparatus is adapted to test at least one integrity characteristic of the mattress in use.

Preferably, the at least one characteristic comprises at least one dimension of the mattress.

Preferably, the integrity testing apparatus comprises at least one of ultrasonic sensor, laser sensor and mechanical deflection sensor adapted for determining the at least one dimension of the mattress.

Preferably, the at least one characteristic comprises a water content of the mattress.

Preferably, the integrity testing apparatus comprises at least one of mass sensor and electrical conductivity sensor adapted for completing the water content of the mattress.

Preferably, the at least one characteristic comprises an internal structure characteristic of the mattress.

Preferably, the integrity testing apparatus comprises at least one of x-ray sensor and the magnetic sensor adapted for determining the internal structure or characteristic of the mattress.

Preferably, the at least one characteristic comprises a visual characteristic.

Preferably, the visual characteristic comprises colour.

Preferably, the integrity testing apparatus comprises an image capture device.

Preferably, the visual characteristic comprises a stain characteristic.

Preferably, the at least one characteristic comprises a contaminant characteristic.

Preferably, the silage bin comprises an open side adapted for the lateral insertion of mattresses therein.

Preferably, the silage bin comprises anti-burst strapping.

Preferably, the silage bin is adapted for manoeuvring atop an air cushion.

Preferably, the silage bin comprises air cushion generation means.

Preferably, the air cushion generation means comprises a fan.

Preferably, the fan is an electric fan.

Preferably, the silage bin further comprises at least one power source.

Preferably, the at least one power source comprises a rechargeable battery.

Preferably, the at least one power source comprises a solar panel.

Preferably, the silage bin further comprises a skirt.

Other aspects of the invention are also disclosed.

BRIEF DESCRIPTION OF THE DRAWINGS

Notwithstanding any other forms which may fall within the scope of the present invention, a preferred embodiments of the invention will now be described, by way of example only, with reference to the accompanying drawings in which.

DESCRIPTION OF EMBODIMENTS

Figure 1:
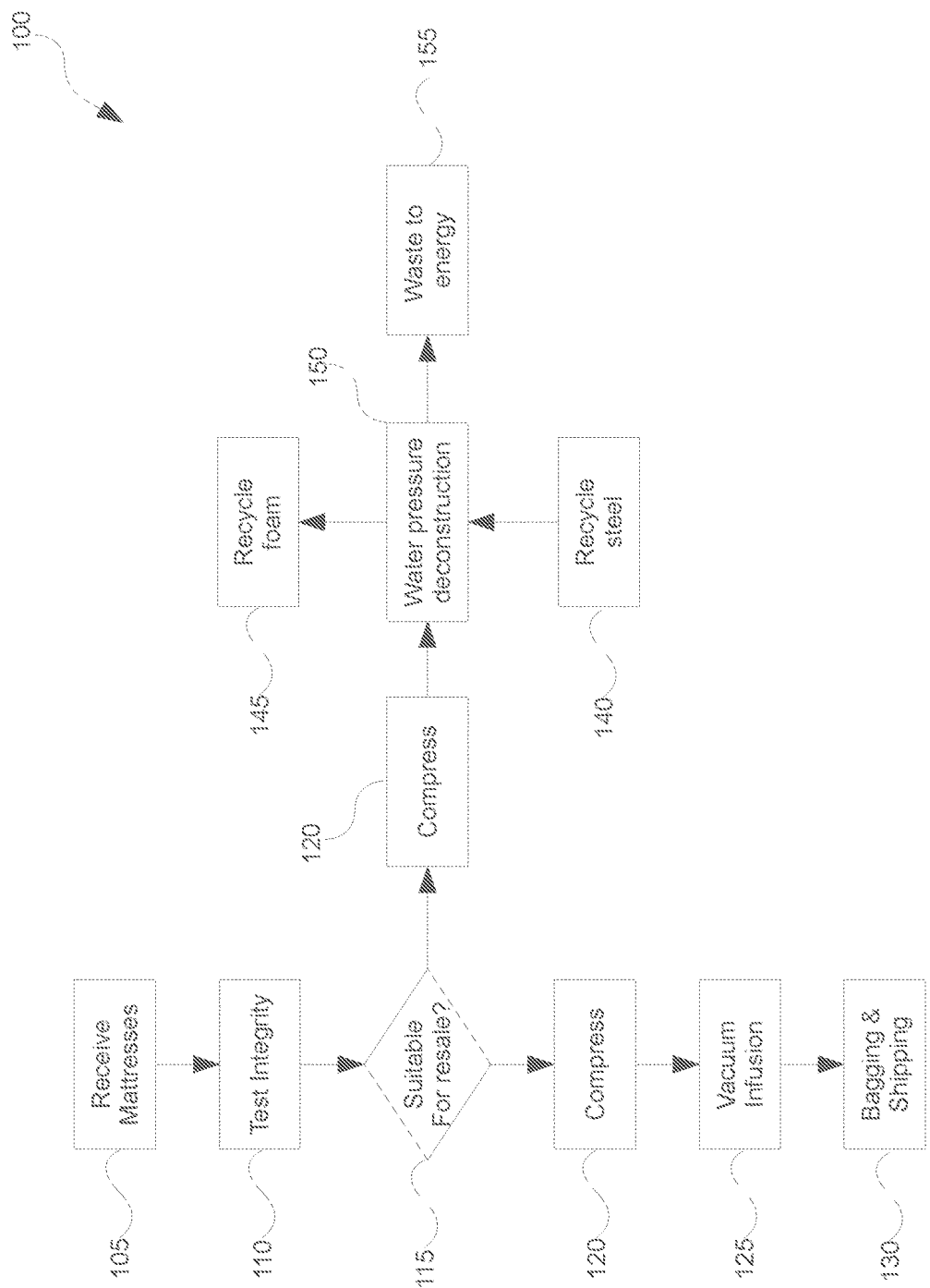
FIG. 1 shows a method for processing a used mattress in accordance with a preferred embodiment of the present invention.

It should be noted in the following description that like or the same reference numerals in different embodiments denote the same or similar features.

A Method for Processing a Mattress

FIG. 1 shows a method 100 for processing a mattress.

As alluded to above, the method 100 will be described herein with reference to the preferred embodiment of deconstructing a mattress. However, it should be noted that the embodiments described herein may be equally applicable for deconstructing other composite items, such as car seats, sofas and the like, these items generally being composite items comprising fabric, foam and the like and structural reinforcements such as springs, frames and the like. Generally, the embodiments described herein provide advantages in the processing of composite items comprising steel or other metal subframes and, as alluded to above, those composite items being volumous in nature, these volumous items being prone to disadvantages in the transportation, deconstruction, water saturation, contamination and the like.

As will become apparent from the description below, the method 100 is adapted for providing for the resale of a mattress if mattresses on a suitable condition, or the deconstruction of the mattress into constituent parts including for the purposes of recycling, energy generation and the like if the mattress is in an unsuitable condition.

While the apparatus involved in each step of the method 100 will be described in further detail below, a broad level overview of the method 100 is provided as follows:

The method 100 comprises a receipt step 105 where the mattress is received. Generally, the receipt of the mattress 105 is at a mattress receiving depot or the like wherein municipal council trucks, the general public and the like may drop off mattresses for processing. Alternatively, the mattresses may be collected from landfill sites and the like. In one embodiment, and so as to provide advantages for especially contaminated mattresses, the mattresses may be provided in a first bag, wherein the mattress is inserted in the first bag into a second bag in the manner described below for the purposes of infusion, compression, deconstruction and the like. The use of the first bag offers safety advantages to those handling the mattresses especially from contaminants and the like.

These mattresses are used mattresses and therefore may comprise contaminants, water and the like. As will become apparent from the ensuing description, the embodiments described herein are especially suited for the processing of used mattresses in a manner which addresses the problems associated with the processing of used mattresses such as contamination, water content, OH&S safety issues and the like as is therefore distinguished, for example, from a method of processing new mattresses.

The method 100 further comprises an automated mattress integrity testing step 110 wherein the integrity of the mattress is ascertained. During the integrity testing step 110 various characteristics of the mattress are ascertained, including in an automated manner. As will be described in further detail below, these characteristics are used by the embodiments described herein for the purposes of making a decision as to whether the mattress is fit for resale or should be deconstructed. In the case where the mattress is deemed suitable only for deconstruction, the various characteristics are ascertained during the mattress integrity testing step 110 may be fed forward to the deconstruction step 150 (as will be described hereunder) so as to aid in the deconstruction of the mattress.

Various characteristics may be ascertained. For example, the resilience of the mattress may be ascertained using a physical deflection sensor or the like to ascertain the structural integrity of the mattress. Furthermore, various imaging technique may be employed for the purposes of ascertaining the state of soiling of the mattress (such as caused by human bodily fluids and the like), contaminant content and the like. These imaging techniques may comprise visible and invisible (i.e. ultraviolet or infrared) light imaging technique. Yet further, various techniques may be employed for the purposes of ascertaining the water content of the matter, such as by electrical conductivity testing, wheat measurement or the like. Further, magnetic, x-ray, ultrasonic or other penetrating technique may be employed for the purposes of ascertaining or identifying the internal structure of the mattress. In one embodiment, the spring configuration type of the mattress (whether integral spring configuration or stand-alone spring configuration) may be ascertained for the purposes of configuring the deconstruction apparatus in the deconstruction step 150 so as to handle the differing spring types differently. Yet further, mattress identification means may be employed to identify the make and model of the mattress so as to typical characteristics of the mattress. Such a mattress identification means may utilise image recognition technique to identify various trademarks adhered to the mattress, read barcode images or the like. In one embodiment, these various characteristics may be stored in a database, so as to assist in greater accuracy during subsequent recognition of other mattresses.

The method 100 further comprises a compression stage where the mattress is compressed. Such compression provides advantages not only in the space efficient transportation of the mattress (such as where the vacuum infusion or water pressure deconstruction apparatus are located away from the receiving depot) and also in the efficiency of deconstruction. During a compression stage, the mattress may be compressed in volume by a factor of 10. During a compression stage, water may be squeezed from the mattress also. Once compressed, the mattress may be bagged, such as by being enclosed within an airtight heat sealed plastic bag so as to maintain the compressed state of the mattress.

The compressed mattresses are then transported to the vacuum infusion or water pressure deconstruction apparatus.

Where the mattress has been deemed to be fit for resale, the method 100 comprises a vacuum infusion stage 125 wherein the mattress is infused with chemicals in anticipation of resale or storage for extended periods of time. During the vacuum infusion stage 125, a vacuum is employed to draw chemicals within the mattress. Such chemicals may comprise disinfectants, insecticides, fire retardants and the like. In infusing the mattress, an aperture may be created at one end of the mattress for the introduction of the chemicals and an opposing aperture created at another end of the mattress for the purposes of introducing a vacuum such that the chemicals were drawn through the mattress. In other embodiments, the vacuum packed bagging may be simply removed from the mattress wherein as the mattress expands, the chemicals were drawn within the mattress, such as by expanding the mattress any chemical bath, or other chemically saturated atmosphere.

Once the mattress has been vacuuming infused, the mattress may be bagged and shipped for resale at step 130 of method 100.

Alternatively, if, during the integrity testing stage 110, it is deemed that the mattress is unsuitable for resale, the mattress may be sent for deconstruction. As such, the method 100 comprises deconstruction stage 150 where water pressure is utilised for the purposes of deconstructing the mattress so as to separate composite items of the mattress. In this step, the material, foam, padding and the like are separated from the spring framework of the mattress. Such foam, padding, material and the like may be sent for recycling at step 145 and the spring steel sent for recycling at step 140. Material unsuitable for recycling may be sent for energy production purposes at step 155.

As alluded to above, information gathered during the integrity testing stage 110 may be employed during the deconstruction stage 150 in deconstructing the mattress in differing manners.

In a preferred embodiment, the apparatus described herein may be deployed in a mobile cargo container, such as a 20 foot or 40 foot container so as to allow for deployment at suitable locations. For example, the compression apparatus may be deployed within the container and deployed to a land fill site for the purposes of compressing mattresses in anticipation of transportation to a mattress processing facility where the mattress processing facility comprises the integrity testing apparatus, deconstruction apparatus, an infusion apparatus and the like as will be described in further detail below. In this embodiment, such mobile containers may comprise the requisite attendant services such as generators for producing electricity, data links for sending and receiving data relating to the operation thereof water treatment facilities for the purposes of treating wastewater and the like.

Now, there will now be described the various apparatus employed in conducting the method 100.

Computing Device

Figure 2:
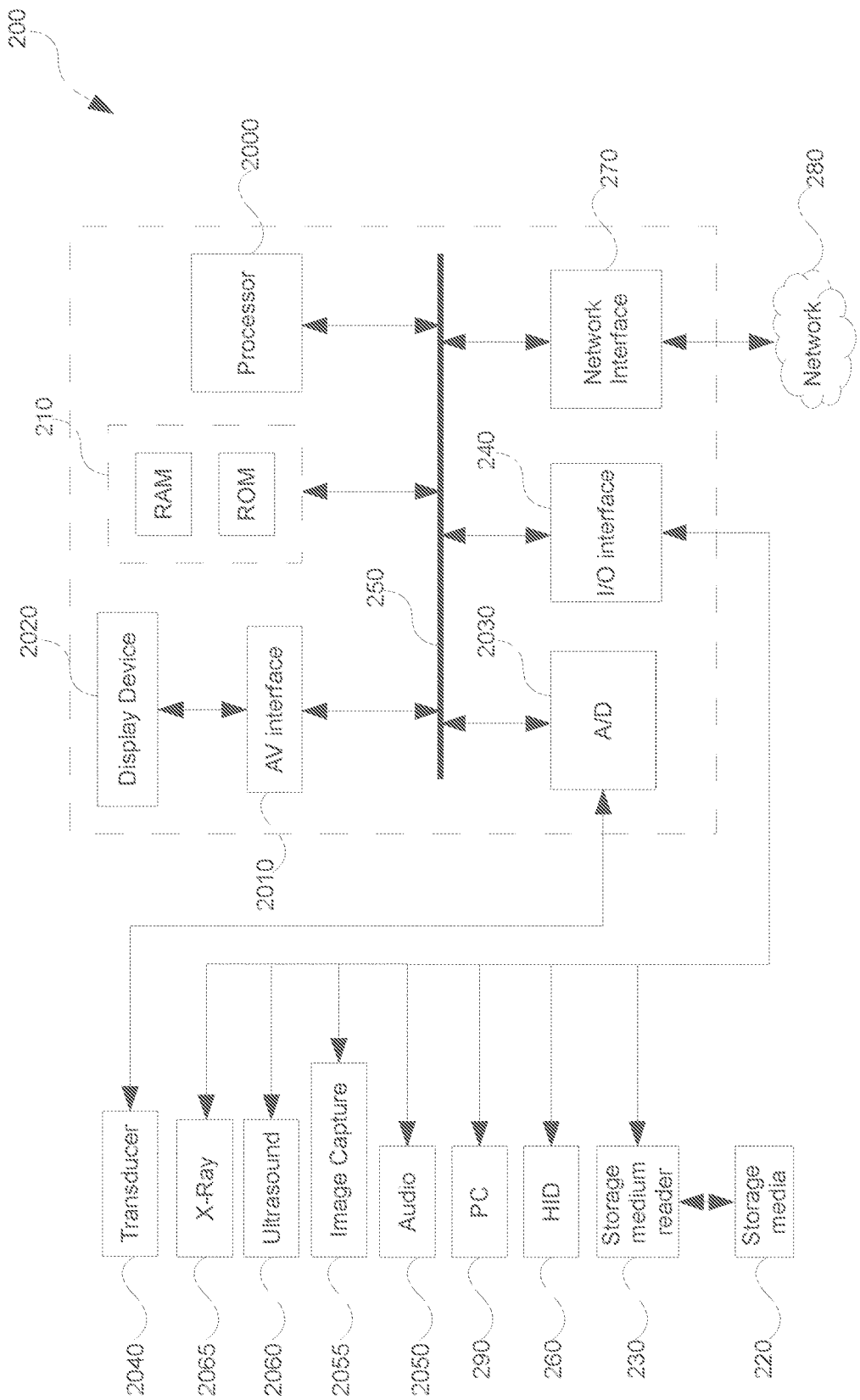
FIG. 2 shows a computing device for controlling the apparatus as described herein in accordance with another embodiment of the present invention.

FIG. 2 shows an embedded controller 200 on which the various embodiments described herein may be implemented.

As will become apparent from the description hereunder, the controller 200 is utilised in controlling various apparatus described hereafter. Specifically, the controller 200 may be employed during the integrity testing stage 110 wherein various data ascertain from various sensors is utilised for the purposes of determining what or characteristics of the mattress. The controller 200 may be employed at other steps of the method 100 including during the vacuum infusion stage 125, compression stage 120, water pressure deconstruction stage 150 and the like.

The controller 200 comprises memory 210 which may comprise volatile memory (RAM) and/or non-volatile memory (ROM). Typically the memory 210 comprises a combination of volatile and non-volatile memory, such that the non-volatile memory stores the controller 200 firmware and the volatile memory stores one or more temporary results of the fetch-decode-execute cycle, as described below.

The controller 200 comprises a computer program code storage medium reader 230 for reading data from a computer program code storage medium 220. The storage medium 220 may be optical media such as CD-ROM disks, magnetic media such as floppy disks and tape cassettes or flash media such as USB memory sticks.

The I/O interface 240 communicates with the storage medium reader 230 and may take the form of a SCSI, USB or similar interface. The I/O interface 240 may also communicate with one or more human input devices (HID) 260 such as a keyboard or pointing devices. The I/O interface 240 may also communicate with one or more personal computer (PC) devices 290, using a suitable interface such as an RS-232 interface. The I/O interface may also communicate audio signals to one or more audio devices 2050, such as a speaker or a buzzer.

The I/O interface 240 may further receive information from image capture device 2055, such as for use in the mattress integrity testing step 110 where various visual characteristics of the mattress are captured.

Furthermore, the I/O interface 240 may further receive ultrasound information from ultrasound device 2060 which may similarly be used during the mattress integrity testing step 110.

Yet further, the I/O interface 240 may further receive x-ray information from x-ray device 2065, which may be especially suited for determining the inner structure of the mattress during the integrity testing step 110.

The controller 200 also comprises a network interface 270 for communicating with one or more computer networks 280. Network 280 may be a wired network, such as a wired Ethernet™ network or a wireless network, such as a Bluetooth™ network or IEEE 802.11 network. The network 280 may be a local area, such as a home or office computer network, or a wide area network, such as the Internet.

Typically computer program code is preloaded into the memory 200. However, computer program code instructions may be loaded into the memory 210 from the storage medium 220 using the storage medium reader 230 or from the network 280.

The controller 200 comprises an arithmetic logic unit or processor 2000 for performing computer program code instructions. The processor 2000 is typically a low-power microprocessor suited to low power embedded controller applications. During the bootstrap phase, an operating system and one or more software applications are loaded the memory 210. During the fetch-decode-execute cycle, the processor 2000 fetches computer program code instructions from memory 210, decodes the instructions into machine code, executes the instructions and stores the results in the memory 210.

The controller 200 also comprises a video interface 2010 for conveying video signals to a display device 2020, such as a liquid crystal display (LCD), cathode-ray tube (CRT) or similar display device. The display device 2020 may be embedded in the controller 200, or located at a remotely.

The controller 200 further comprises an analog to digital (A/D) converter 2030 for converting analog signals from transducer 2040 into a digital format. For example, the transducer 2040 may be a strain gauge or the like for the purposes of interfacing with a pressure sensor 350 (described below) for the purposes of determining the integrity of the mattress during the integrity testing stage 110. Yet further, the transducer 2040 may be employed for other purposes also such as determining water pressure, actuator position and the like.

The controller 200 also comprises a communication bus 250 for interconnecting the various devices described above.

Mattress Integrity Testing Apparatus

Figure 3:
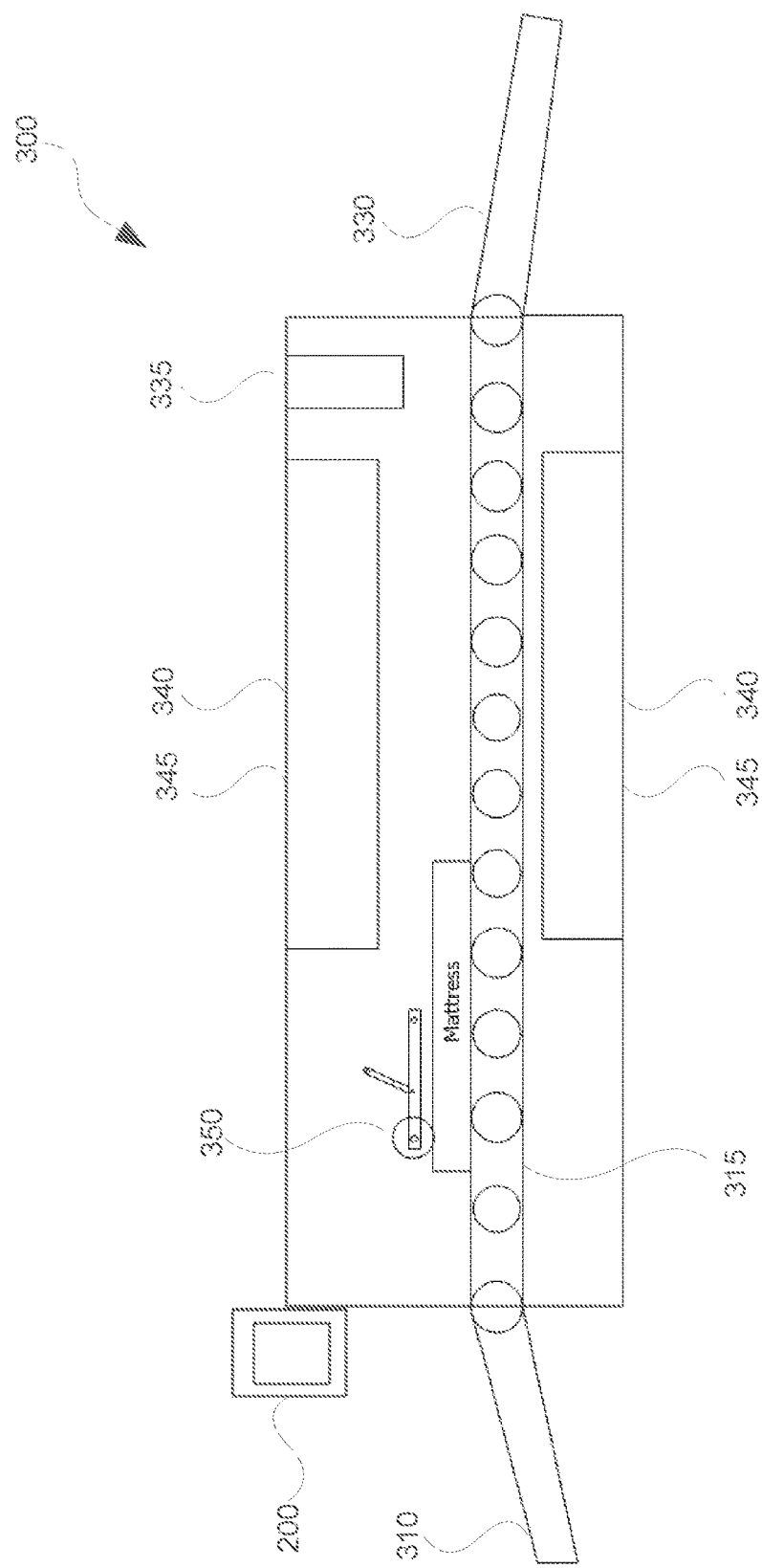
FIG. 3 shows an integrity testing apparatus for testing the integrity of a mattress in accordance with another embodiment of the present invention.

Turning now to FIG. 3, there is shown a mattress integrity testing apparatus 300 adapted for determining various characteristics relating to the mattress so as to infer an integrity score for the mattress. As alluded to above, the characteristics as ascertained by the mattress integrity testing apparatus 300 may be employed in the decision-making process as to whether the mattress are suitable for resale, or should rather be destroyed.

Also as alluded above, the various characteristics as ascertained by the mattress integrity testing apparatus 300 may be fed forward to further apparatus including the water pressure deconstruction apparatus (described in further detail below) for the purpose of configuring the water pressure deconstruction apparatus in accordance with the characteristics of the mattress.

The integrity testing apparatus 300 comprises a controller 200 adapted for controlling the operation of the testing apparatus 300.

The testing apparatus 300 comprises a transfer conveyor 315 having an infeed 330 and an outfeet 310. The mattress is fed in at the infeed 330 for testing.

In one embodiment, the testing apparatus 300 may comprise laser or ultrasonic sensors 335 for ascertaining the surface characteristics of the mattress. For example, the sensors 335 may calculate the dimensions of the mattress. For example, the sensor 335 may classify the mattress as being a single, queen size or king size mattress. Yet further, the sensor 335 may ascertain other characteristics such as the height of the mattress. Data collected from the sensor 335 is stored by the computing device 220 for later use.

As alluded to above, where the data is used by subsequent apparatus employed by the method 100, in this embodiment, the dimensions as ascertained by the laser or ultrasonic sensors 335 may be employed by the subsequently described compression apparatus, water pressure deconstruction apparatus 150, vacuum infusion apparatus 135 and the like.

For example, where the laser or ultrasonic sensors 335 ascertains that the mattress is a king size mattress, the water jets of the water pressure deconstruction apparatus (described below) may be operated across a wider cutting area so as to accommodate the greater width of the king-size mattress as opposed to a single sized mattress. Similarly, the amount of chemicals administered by the vacuum infusion apparatus (described below) may be determined by the volume of the mattress determined by the laser or ultrasonic sensors 335.

In a further embodiment, the integrity testing apparatus 300 may comprise a mass scale (not shown) for the purpose of measuring the mass of the mattress. The mass as ascertained by the mass scale may be suited for the purposes of ascertaining any one of the dimensions, make and the like of the mattress.

In a further embodiment, the mass scale may be employed for the purposes of calculating the water content of the mattress. Specifically, working in conjunction with the data ascertain from the laser or ultrasonic sensors 335, the controller 200 may be controlled by the computer program code to firstly calculate the volume of the mattress in accordance with the data as ascertained by the laser or ultrasonic sensors 335, and then, utilising the mass data collected from the mass sensors, calculate the water content of the mattress. In this manner, having calculated the water content of the mattress, the subsequently described compression apparatus may be adapted to squeeze the mattress in accordance with the amount of determined water content.

It should be noted that in other embodiments, other sensors may be utilised for the purposes of ascertaining the dimensions of the matters. Specifically, the testing apparatus 330 may comprise a simple type deflection sensor to ascertain the height, with and breadth of the mattress.

Yet further, the integrity testing apparatus 330 may comprise visioning means 345 comprising image capture devices 2055 for the purposes of capturing image data of the mattress. The image data may be utilised for a number of purposes. In one embodiment, the image data may be utilised for the purposes of ascertaining the extent of stains, discolouration and the like of the mattress. In this manner, should the mattress comprise stains or discolouration above a certain threshold, the controller 200 may classify the mattress as being suitable only for deconstruction. In another embodiment, the image data may be utilised for the purposes of identifying the type of mattress. Specifically, mattresses may be provided with various manufacture labels, trademarks or other visual characteristics which the controller 200 may utilise in comparison with a database of known manufacturer labels, trademarks rather visual characteristics for calculating the make and model of the mattress. For example, should the control computer 200 identify from the image data that the mattress is a Sealy Posturepedic manufactured in 1971, the computer 200 may classify the mattress as being suitable only for deconstruction on account of its age.

Yet further, in a similar manner as alluded to above, having identified the mattress type, the controller 200 may determine whether or not the actual mattress conforms with the typical mattress characteristics of the make and model of the mattress. For example, should a mattress type have a white material, should the controller 200 ascertain that the colour of the present mattress is yellowed, the controller 200 is able to calculate the deviation in colour from the normal colour of the type of mattress for the purposes of calculating whether or not the mattress is suitable for deconstruction or resale. Similarly, the controller 200 may ascertain the weight deviation from the mattress type so as to, for example, determine the water content of the mattress.

It should be noted that the image capture device 2055 may be adapted for capturing light in the non-visible spectrum, such as in the infrared or ultraviolet spectrum. In this manner, the integrity testing apparatus 300 may comprise ultraviolet lights 345 for the purposes of illuminating the mattress with ultraviolet light. By utilising light captured in the invisible light spectrum, the controller 200 may be adapted for ascertaining the extent of invisible contaminants, including bacterial, fungal or other biological hazards.

It should be noted that in the embodiment presented, the testing apparatus 300 comprises both downward and upward facing visioning camera 345 and respect of lighting 340. In this manner, the testing apparatus 300 is adapted for vision in both the upper and lower surfaces of the mattress. Similarly, the testing apparatus 300 may comprise laterally disposed visioning apparatus for visioning the edges of the mattress.

It should be noted that integrity data may be captured from other sensors including those enumerated above. Specifically, the testing approach 300 may comprise an x-ray sensor 2065 for the purposes of identifying the internal spring structure of the mattress. As alluded to above, the nature of the spring structure of the mattress may affect how the mattress is deconstructed by the deconstruction apparatus (described below). Also as alluded to above, in certain embodiments, having identified the type of mattress, the controller 200 may ascertain characteristics of the mattress in accordance with a database. For example, as opposed to utilising an x-ray sensor 2065, the testing apparatus 300 may alternatively identify the type of mattress so as to select the type of spring structure from the database of known mattress types.

The testing apparatus 300 further comprises rolling pressure sensor 350 adapted to bear against the upper surface of the mattress as the mattress is conveyed passed the rolling pressure sensor 350. Pressure profile data recorded by the controller 200 from the rolling pressure sensor 350 may ascertain the integrity of the spring structure of the mattress such as whether the spring structure has collapsed or is suitably rigid for resale. Yet further, the pressure profile data recorded by the controller 200 may be utilised for the purposes of ascertaining lumps and bumps in the mattress which otherwise render the mattress unsuitable for resale. In one embodiment, the controller 200 may discriminate the resale eligibility of a mattress in accordance with a pressure threshold wherein, for example, should the ascertained resilience of the mattress fall beneath the threshold (i.e. the springs have collapsed) the controller 200 may be adapted to fail the mattress. Alternatively, the controller 200, especially in embodiments where the threshold resilience of the mattress may not be known, may be adapted to calculate the deviation of the pressure profile data across the surface of the mattress such that should the pressure deviate more than a certain threshold (i.e. Indicative of lumps and bumps) the controller 200 may fail the mattress for resale. In one embodiment, the testing apparatus 300 may feed forward the results of the pressure test performed by the pressure sensor 535 such that, for example, subsequent compression apparatus may apply differing amounts of pressure accordingly.

In other embodiments, other integrity testing may be performed over and above those shown in FIG. 3. Such integrity testing may further comprise manual integrity testing, wherein, for example an operator visually inspect a mattress so as to input a product code or other mattress descriptor into HID device 260 for the purposes of complimenting the sensor data used by the controller 200.

In another embodiment, the integrity testing apparatus 300 may comprise a conductivity sensor adapted to pass a current through the mattress for the purposes of measuring the resistance so as to ascertain the water content wherein the greater the water content, the lower the electrical resistance.

In one embodiment, the testing apparatus 300 may be adapted for the purposes of detecting pathogens, whether in an automated or a manual manner wherein various pathogens are identified for notification of various health authorities. For example, the testing apparatus 300 may be adapted for identifying the yellow fever pathogen wherein, if yellow fever is detected, data is transmitted by the testing apparatus 300 to the appropriate health authorities for notification purposes. Similarly, the testing apparatus 300 may be adapted for detecting macroscopic organisms including bedbugs and the like. In one embodiment, upon the detection of such pathogen or other organism, the testing apparatus 300 may be adapted to notify the relevant statutory authority, such as the Centre for disease control or other is appropriate, including in an automated manner wherein the testing apparatus 300 sends such notification by way of data network 280.

Once the integrity of the mattress has been tested by the testing apparatus 300, the mattress exits at outfeed 310 for subsequent processing. Such subsequent processing will be determined by the determination of the integrity of the mattress, especially in determining whether or not the mattress is suitable for resale or deconstruction.

As alluded to above, in one embodiment, the results of the integrity testing may be utilised by the other apparatus described herein. In this manner, the integrity testing apparatus 300 may make such data available in a number of manners. In one embodiment, the integrity testing apparatus 300 is adapted to make such information known by transmitting the data across data network 280. In alternative embodiments, the data may be encoded using a 2-D barcode, NFC chip or the like and physically adhered to the mattress for subsequent reading by the subsequent apparatus described herein. In one embodiment, the integrity testing apparatus 300 may mark the mattress in a certain manner so as to provide a visual clues to operators, such as a red cross to indicate that the mattress is suitable only for deconstruction.

Compression

Referring again to FIG. 1, there is shown the method 100 comprising a compression stage 120 where the mattress is compressed. As alluded to above, the compression of the mattress comprises several advantages, including the volumetric transportation advantages, deconstruction efficiencies and the like.

Generally, having being processed through the integrity testing apparatus 300, the mattress is subsequently compressed so as to be suited for subsequent deconstruction, transportation and the like.

In a preferred embodiment, the receiving depot comprises the integrity testing apparatus 300 which determines whether or not the mattress is suitable for resale or deconstruction. Then, once the mattresses have been classified as being suitable for resale or deconstruction, the mattresses are ready for transportation wherein the mattresses are compressed and dispatched to the appropriate resale or deconstruction depot. Of course, in other embodiments, the integrity testing apparatus 300 and the compression and vacuum infusion apparatus (as described below) may be co-located.

Furthermore, it should be noted that in various embodiments, the mattress need not necessarily first undergo integrity testing at step 110 of method 100 prior to being compressed. Rather, in one embodiment, the mattresses may be compressed so as to be readied for transportation to the appropriate integrity testing depot. As will become apparent from the below description, especially with reference to the description of the mattress silage bin, the space savings afforded by the compression, wherein the volume of the mattress may be reduced by a factor of 10, provides great advantages in the efficient transportation of the mattresses.

Figure 5:
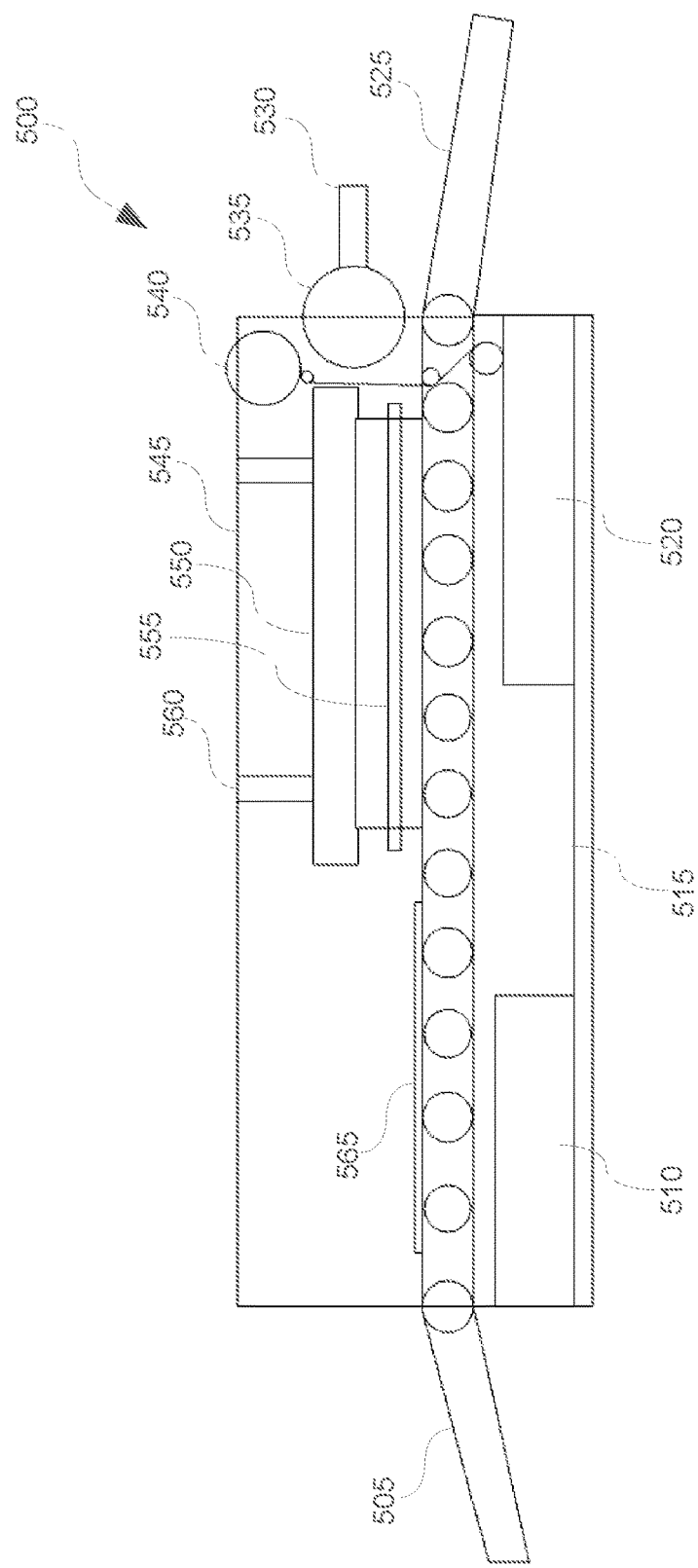
FIG. 5 shows a compression apparatus for compressing a used mattress in accordance with another embodiment of the present invention.

As such, referring to FIG. 5, there is shown a compression apparatus 500 adapted for compressing the mattresses. The compression apparatus 500 may be similarly controlled by a controller 200 (not shown in FIG. 5). Alternatively, the compression apparatus 500 may be manually operated, such as by the operator manipulation of various actuators.

In one embodiment, where the level of the compression apparatus 500 is important for the operation thereof, the compression apparatus 500 may be provided with levelable supports, such as screw jacks or the like so as to allow for the manipulation of the level of the compression apparatus 500. The compression apparatus 500 may further comprise a spirit level for feedback purposes.

The compression apparatus 500 comprises an infeed 525 where the mattresses are introduced to the compression apparatus 500 in an uncompressed state and an outfeed 505 where the mattresses exit the compression apparatus 500 in a compressed state. As alluded to above, the mattresses, in the compressed state, may have a thickness being one tenth of the thickness of the mattress in the uncompressed state. In this manner, up to 10 times the number of mattresses may be transported greatly increasing the transportation efficiency of the method 100.

As alluded to above, the compression apparatus 500 is especially adapted for processing used mattresses, including those mattresses comprising water content. In this manner, the compression apparatus 500 comprises a squeeze roller 535 adapted to squeeze the water content from the mattress. In this manner, as the mattress passes underneath the squeeze roller 535, the water is squeezed from the mattress. It should be noted that while one squeeze roller 335 is shown in FIG. 5, in other embodiments more than one squeeze roller may be employed so as to adduce the mattress through several stages of squeezing so as to even further reduce the water content of the mattress. The apparatus 500 may comprise a water treatment plant 520 where the water is collected from the mattresses for subsequent disinfection, or other steps as be suitable for wastewater or reuse. Furthermore, while an upper squeeze roller 535 as shown in the embodiment, in another embodiment, the compression apparatus 500 comprises an upper and a lower squeeze roller 535 which are simultaneously driven in a counter rotating manner so as to cooperate in assisting the mattress there through.

The squeeze roller 535 may comprise an attendant squeeze roller dryer 530 for drying the squeeze roller 535.

The height of the squeeze roller 535 may be configured so as to accommodate different mattress dimensions. In this manner, the height of the squeeze roller 535 may be set in accordance with the dimensions measured by the laser or ultrasonic sensors 535 of the integrity testing apparatus 300. Alternatively, the squeeze roller 535 may be coupled to a strain gauge so as to always apply the same amount of pressure to the mattress. Alternatively, the height and or pressure exerted by the squeeze roller 335 may be configured in accordance with the calculated water content of the mattress.

Having passed through the squeeze roller, the mattress is provided with a plastic film provided by plastic film roller 540. In one embodiment, there is a risk that a broken spring or the like of the mattress may puncture the plastic film. In this regard, prior to the provision of the plastic film, the mattress may be provided with a protective layer, such as a cardboard layer or the like which sits between the mattress and the plastic layer so as to prevent the puncture of the plastic layer.

In one embodiment, the compression apparatus 500 may comprise plastic film rollers 540 of different widths so as to accommodate mattresses of different dimensions. In this embodiment, the compression apparatus 500 may be adapted to automatically switch between the film rollers in accordance with the mattress type.

Thereafter, the mattress is conveyed beneath the press plate 550 sheathed in the plastic film. Once beneath the press plate 550, press plate rams 560 are activated to compress the mattress. During this stage additional water may drop from the mattress which may be collected by water drain collection 515.

Once the mattress has been compressed, plastic film heat knives 555 seal the plastic film about the mattress so as to provide an airtight bag around the mattress in the compressed state. Thereafter, the press plate 550 is drawn upwards so as to allow the mattress to be conveyed in the compressed state 565 towards the outfeed 505.

It should be noted that in certain embodiments, a press plate 550 need not necessarily be employed wherein the mattress is introduced into the plastic film in a compressed state by an apparatus comprising a squeeze roller in conjunction with the plastic film roller wherein the combined plastic film squeeze roller simultaneously squeezes the mattress and introduces the film. In this manner, they need not necessarily be a delay of the conveyor of the compression apparatus 500 to allow time for the press plate 550 to press.

In a yet further embodiment, the compression apparatus 500 need not necessarily comprise mechanical compression apparatus. Specifically, the mattress may be introduced within a plastic film bag in the uncompressed state wherein the compression apparatus 500 comprises a vacuum generator to withdraw the air from the film bag such that the mattress is naturally compressed by the pressure differential.

The compression apparatus 500 may further comprise a generator, compressor, hydraulic controls and the like 510.

Now, having compressed the mattress and having enclosed the mattress within the film bag so as to maintain the compressed state of the mattress, the mattress may now be transported or alternatively fed into the vacuum infusion apparatus or water deconstruction apparatus (to be described in further detail below) depending on whether the mattress is suited for resale or deconstruction.

Silage Bin

Figure 7:
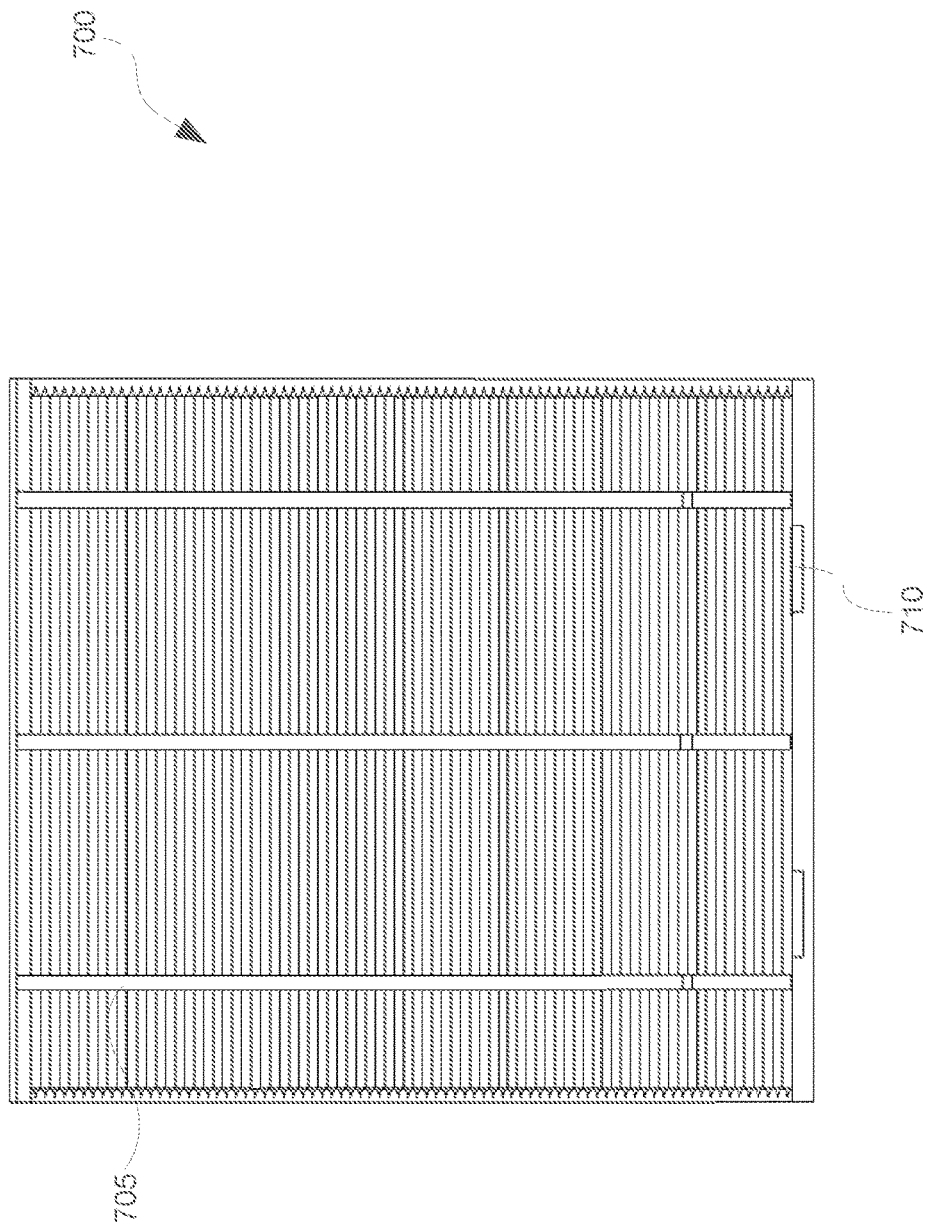
FIG. 7 shows a silage bin for storing a mattress in accordance with another embodiment of the present invention.

Turning now to FIG. 7, there is shown a silage bin 700 especially suited for transporting the mattresses in the compressed state.

As is apparent from the embodiment given in FIG. 7, the silage bin 700 comprises a number of mattresses in the compressed state. Each mattress within the silage bin 700 is within the film bag so as to prevent the mattress from becoming decompressed.

In the loading of the silage bin 700 the compressed mattresses may be fed from the compression apparatus 500 via conveyor towards the upper lip of the silage bin 700 to drop within the silage bin 700. Alternatively, a vacuum grip hoist may be utilised.

However, in a preferred embodiment, the silage bin 700 comprises a three sided frame so as to allow the loading of the silage bin 700 laterally. In this manner, where a conveyor is utilised for the purposes of loading the silage than 700, the conveyor may be slowly raised during the loading stage such that each subsequent mattress is introduced into the silage bin 700 at the appropriate height in accordance with the other mattresses already within the silage bin 700.

In another embodiment, the height of the conveyor may be static wherein the bin is gradually lowered so as to accommodate subsequent mattress insertions at the appropriate level.

Once loaded, anti-burst strapping 705 may be employed so as to substantially guard against the possibility of at least one of the mattresses from becoming decompressed such as where the film bag surrounding the mattress becomes punctured.

The silage bin 700 may comprise forklift tine slots 710 so to be adapted for the receipt of forklift tines therein so as to be suited for transportation using a forklift.

In one embodiment, so as to assist the mobility of the silage bin 700, the silage bin 700 may be adapted to introduce an air cushion beneath the silage and 700 so as to create a hovercraft effect so as to allow the silage bin 700 to be pushed about by an operator across a smooth surface such as a warehouse floor.

In one embodiment, the silage bin 700 may be collapsible, such as wherein the side walls of the silage bin 700 adapted to fold, including folding downwards to be secured by the base of the silage bin 700. Such an embodiment provide advantages in the deployment of silage bin is 700, especially with reference to the above-mentioned embodiment where the apparatus described herein is adapted for mobility, including in the deployment in shipping containers and the like. In this manner, a number of silage bins 700 may be provided in compact form for subsequent erection and use.

In this manner, the underside of the silage bin 700 may be provided with skirting or the like for the purposes of capturing the air cushion. In one embodiment, so as to reduce the volume of the a cushion, independent air bearings, such as four air bearings each respectively located at a corner of the silage bin 700 may be employed. The silage bin 700 may further comprise battery operated turbofans and associated battery supply for the purposes of forcing air within skirting. The battery supply of each silage bin 700 may be configured for recharging utilising conventional electrical outlet. However, in one embodiment, the silage bin 700 may comprise upwardly located solar panels for the purposes of recharging the batteries of the silage bin 700. In this manner, were the silage bin 700 left outside the warehouse in direct sunlight, the silage bin 700 would store energy for the purposes of subsequent use.

In this manner, once the silage bin 700 has been loaded, the operator would flick a switch so as to cause the silage than 700 to raise up upon the air cushion. The operator is then able to push the silage bin 700 to the appropriate location.

Vacuum Infusion

There will now be described in the embodiment where the mattress is deemed suitable for resale. In this manner, prior to resale, the mattress may be treated so as to be suitable for resale, especially in eliminating contaminates, pathogens and the like.

As such, prior to resale, the mattress may be washed, repaired, decontaminated and the like. Such decontamination may take differing forms including gamma ray radiation and the like. However, in a preferred embodiment, the treatment includes a chemical treatment of the mattress prior to resale.

Figure 6:
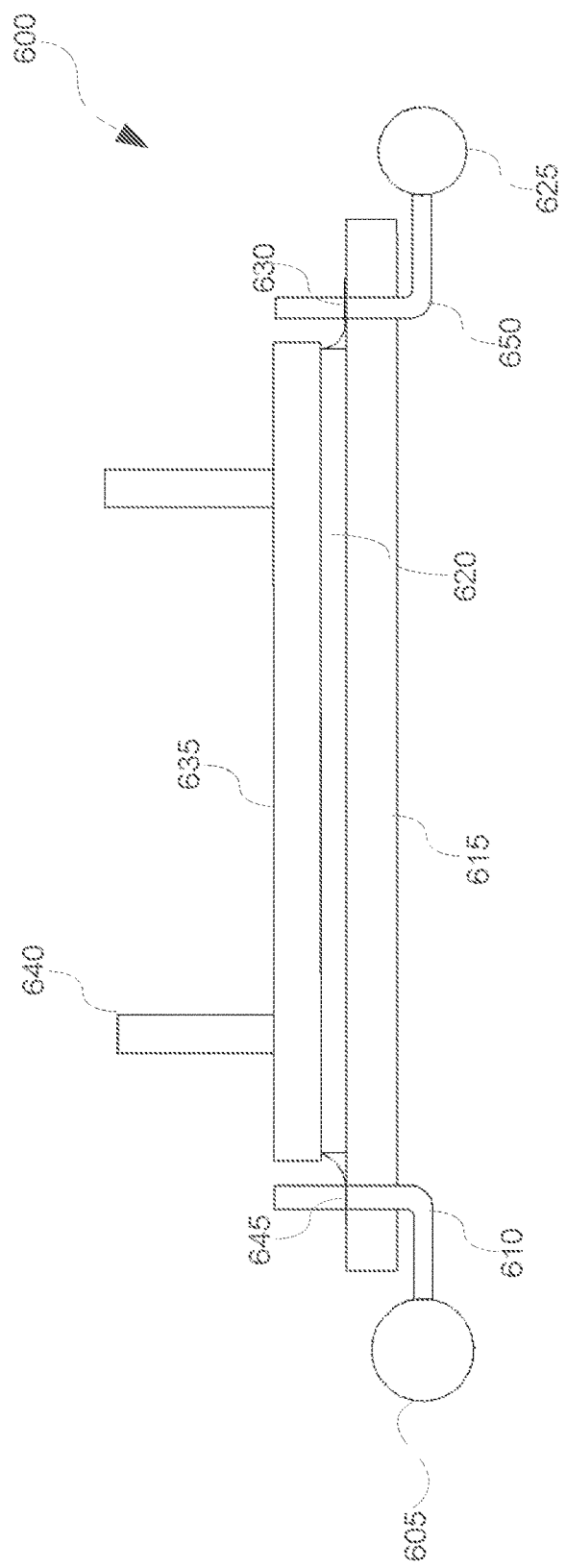
FIG. 6 shows an infusion apparatus for infusing a mattress in accordance with another embodiment of the present invention.

As such, and referring to FIG. 6, there is shown a vacuum infusion apparatus 600 adapted for infusing chemicals within the mattress. As will be described in further detail below, a vacuum is employed for the purposes of drawing chemicals through the mattress.

As alluded to above, differing chemicals may be used, including disinfectants, insecticides, flame retardants, perfumes, cleaners and the like.

Referring to the figure, the infusion apparatus 600 comprises a vacuum pump and filter 605 adapted to create a vacuum at one end of the mattress. At the other end of the mattress, the infusion apparatus 600 comprises a chemical mix container 625 and a chemical infusion port 650 adapted to introduce the chemical mix into the mattress.

It should be noted that in one embodiment, the extracted air may pose safety issues especially where the mattress is contaminated with pathogens or other hazardous material. In this manner, the air drawn by the vacuum may be treated including by filtering and sanitisation prior to expulsion.

In one embodiment, apertures may be made at opposing ends of the mattress so as to increase the efficiency of the vacuum and the introduction of the chemicals. In other embodiments, needlelike structures or the like may be utilised to penetrate within the mattress.

In the embodiment given, the infusion apparatus 600 comprises a press plate 635 and press plate actuators 640 (such as hydraulic rams or the like) adapted to compress the mattress. However, where the mattress arrives already in the compressed eight, the press plate 635 may be simply utilised to maintain the compressive state of the mattress such that the mattress does not expand when the container bag is punctured for the purposes of introducing chemicals.

In the embodiment shown, the chemicals are introduced into the mattress when the mattresses in the compressed state 620. Introducing chemicals into the mattress when the mattress is in the compressed state 620 provide efficiencies in the amount of chemical mix utilised, infusion time and the like. However, in alternative embodiments, the chemicals could be infused within the mattress when the mattress is in the uncompressed state.

It should be noted that in various embodiment, the press plate 635 may be raised and lowered so as to create a sponge affect so as to draw the chemicals within the mattress.

In one embodiment, prior to the vacuum infusion step 125, the mattress would have already been compressed during compression stage 120. In this manner, during the vacuum infusion step 125, the mattress may be infused in the same plastic bag as was provided for during the compression stage 120. Alternatively, the mattress may be removed from the plastic bag provided during the compression step 120 an introduced into a new plastic bag during the vacuum infusion process. It should be noted that in one embodiment, the compression step 120 and a vacuum infusion step 125 may be combined such that the mattress is compressed and infused simultaneously.

In the embodiment shown, the mattress is sandwiched between upper and lower plastic film layers, a vacuum is introduced at one end of the mattress using vacuum pump 605 and chemicals introduced at the other end of the mattress from chemical mix contain a 625. Once the mattress has been sufficiently infused with chemicals, which may be determined in accordance with infusing the mattress for a predetermined amount of time, at or alternatively detecting for the saturation of chemicals at the vacuum end of the vacuum infusion apparatus 600, the plastic sheath surrounding the mattress is heat sealed and patched using heat seal and patch apparatus 645.

In this manner, the mattresses may be transported for resale within the plastic bag provided during the vacuum infusion process, wherein once ready for resale, the mattresses removed from the plastic bag so as to expand naturally.

Water Pressure Deconstruction

Now, as alluded to above, during the integrity testing stage, the mattress may be determined as being ill suited for resale and therefore should be deconstructed and recycled.

Figure 4:
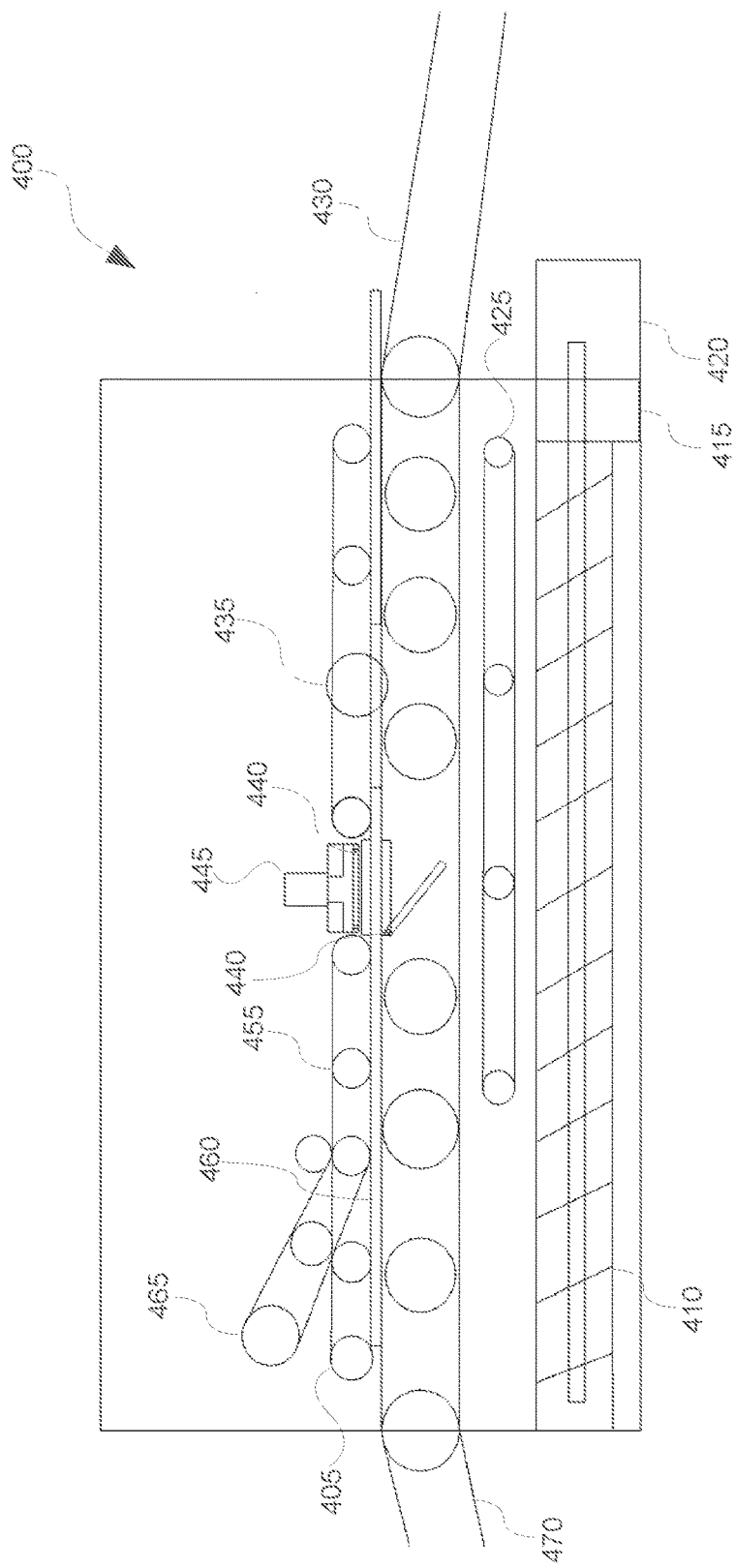
FIG. 4 shows deconstruction apparatus for deconstructing mattress in accordance with another embodiment of the present invention.

As such, referring to FIG. 4, there is shown a deconstruction apparatus adapted to deconstruct the mattress using high-pressure water jets.

As alluded to above, the integrity testing of the mattress may be performed at a reception depot, wherein once the integrity of the mattress has been ascertained, the mattress is compressed and transported to a deconstruction facility comprising the deconstruction apparatus 400. Alternatively, the deconstruction apparatus 400 may be located at the reception depot.

The deconstruction apparatus 400 comprises an infeed 470 and an outfeed 430. The mattresses are fed into the infeed 470 and then stripped by the deconstruction apparatus 410 into constituent parts, wherein the structural components (springs and the like) of the mattress are fed out of the outfeed 430, with the less durable constituent material such as foam, material and the like having been separated.

Now, in a preferred embodiment, the mattresses are deconstructed in a compressed state. Deconstructing the mattresses in a compressed state provides for advantages in the deconstruction process including in providing a smaller cutting target for the water cutting head 445 of the deconstruction apparatus 400. In this manner, the cutting process is more controllable, more confined, and uses less water. It should be noted that the advantages afforded by deconstruction in a compressed state may be equally applicable to other deconstruction apparatus over and above the deconstruction apparatus described hereunder comprising a water cutting head. For example, the provision of the mattress in the compressed state prior to deconstruction by conventional industrial shredding apparatus or the like may similarly provide advantages in greater control, energy efficiency and the like. However, should be noted that in specific is preferable embodiment, the mattress need not specifically be deconstructed in the compressed state.

In one embodiment, over and above been compressed, the mattress may be otherwise constrained so as to prevent parlance, vibration, dissipation of jet energy and the like.

In deconstructing the mattresses in the compressed state, the mattresses may be provided in the plastic bagging as provided by the compression apparatus 500 is described above. In this manner, the mattress is shredded along with the plastic bag.

However, so as to substantially prevent against the mattress taking on the uncompressed state when the plastic bag begins to be destroyed by the water cutting head 445, the deconstruction apparatus 400 may comprise mattress compression plate 455 to maintain the compression of the mattress prior to cutting by the water cutting head 445. As is apparent from the embodiment of the mattress compressing plate is provided along with an upper conveyor matching the rate of the lower mattress conveyor such that the upper and lower mattress conveyor cooperate to feed the mattress towards the water cutting head 445.

It should be noted that the upper mattress compression conveyor may be widened towards the infeed, so as to gradually compress the mattress as it is fed towards the water cutting head 445. In this manner, it may not necessary for the mattress to be provided in the compressed state at the infeed, rather the mattress is compressed by the mattress compression plate prior to feeding towards the water cutting head 445. In this manner, mattresses may be inserted into the in feed 470 of the deconstruction apparatus 400 in the uncompressed state.

In one embodiment, the mattress compression conveyor may take on a raised position 465 or a lowered position 405. In, the mattress compression conveyor may be configured in accordance with the dimensions of the mattress. Alternatively, the mattress compression conveyor may be raised and subsequently lowered for the purposes of compressing the mattress prior to feeding towards the water cutting head.

Now, once beneath the water cutting head, a series of jets of high pressurised water cuts the mattress so as to remove the less durable material such as foam, material and the like from the more durable material such as the structural components of the mattress comprising the spring structure.

The less durable material is ejected towards the bottom of the water cutting head while the spring structure remains for ejection at the outfeed 430.

The water jets of the water cutting heads may be static in position. So as to provide adequate coverage for the mattress, the water cutting heads may comprise successive rows, where the position of the water jets of each successive row is offset from the adjacent row to provide suitable cutting coverage.

The deconstruction apparatus 400 comprises grisly bars 440 located adjacent the cutting zone comprising upwardly located grisly bars 440 and lowedly located grisly bars 440. A purpose of the grisly bars 440 is in retaining the mattress within the cuttings are while at the same time allowing cuts debris to be cleared away from the cutting zone. Generally, the water jets are adapted for positioning between the grisly bars. It should be noted that other structures may be employed as opposed to grisly bars including perforated plate and the like. Preferably, the grisly bars comprise an "aerodynamic" cross section so as to reduce the friction, abrasion and the like of the water jets. In this manner, the grisly bars may have a cigar shaped cross-section or the like.

In an alternative embodiment, the water cutting head is configurable so as to manipulate the reach of the cutting zone. For example, were a wider mattress introduced beneath the wider cutting head, peripherally located water jets may be activated so as to accommodate the wider mattress. The width of the mattress may be determined by appropriate sensors of the deconstruction apparatus 440. Alternatively, the width of the mattress may have been ascertained during the integrity testing step 110.

In an alternative embodiment, the water jets of the water cutting head 445 may traverse laterally across the cutting zone so as to allow for the manipulation of the width of the cutting zone.

In certain embodiments, the trajectory of the water jets may be configured to aid in the cutting process. For example, an obliquely orientated waterjet may assist in ejecting stripped material away from the cutting zone. In certain embodiments, the water cutting head 445 may comprise differing waterjet having differing characteristics and wherein, for example, a high-pressure low-volume vertically orientated waterjet may be employed for the purposes of cutting the mattress wherein an obliquely low pressurised high-volume obliquely orientated waterjet may be employed for the purposes of removing the shredded material away from the cutting zone. In certain embodiments, the trajectory of the waterjet may be adapted to vary during the cutting process so as to reach a cutting zone that would otherwise be obstructed by the spring structure of the mattress.

As alluded to above, the cutting during the deconstruction step 150 may be configured in accordance with the characteristics of the mattress determined during the integrity testing stage 110. For example, should it be determined that the spring structure of the mattress is a wireframe assembly, the deconstruction apparatus 400 would be configured such that the wireframe assembly is moved towards the outfeed 430 of the deconstruction apparatus 400. However, should it have been determined during the integrity testing step 110 that the mattress rather comprise a series of stand-alone springs (pocket springs), the bottom grisly bar 440 may be configured to open such that the individual springs are rather ejected beneath the water cutting head. In this manner, the deconstruction apparatus 400 may comprise a magnetic particle conveyor 425 for the purposes of capturing these springs injected in this manner.

Where the mattress comprises a wireframe assembly, the stripped wireframe assembly is moved towards the outfeed 430 passing steel spring slittings saw 435 adapted to cut the wireframe assembly into manageable portions. For example, the steel spring slitting saw may be configured to cut the wireframe assembly into lengthwise portions each of less than 1 m in width. Then, when the cut wireframe assembly portions are conveyed for the outfeed 430, the wireframe assembly portions may be handled more effectively. In one embodiment at the outfeed there is provided a baling mechanism adapted to wrap the wireframe assembly portions into bales. In addition, the baling mechanism may comprise a wrapping material such as paper, plastic or the like which is interposed between the bail layers to maintain the bale-like structure of the wrapped wireframe assemblies. Once baled, the bale may be secured with strapping, such as steel strapping or the like. The bales may be then sent for metal recycling. It should be noted that the term bale as used herein may be indicative of both stuffing and rolling wherein the wireframe assembly may either be stuffed into a confined rectangle or alternatively rolled into it a roll.

For the less durable constituent materials of the mattress such as the mattress foam, cloth and other materials, such less durable constituent material is collected by the screw dewatering conveyor 410 that screws this material towards the flock removal bin 420. It should be noted that other conveying mechanism may be employed as opposed to the screw dewatering conveyor 410 such as water or air jets, water permeable conveyor and the like. The deconstruction apparatus 400 may further comprise pocket spring removal bin 415 adapted to capture individual springs separated during the cutting process.

In a preferred embodiment, the foam retrieved from the mattress is sent for recycling. In this manner, prior to recycling, the foam may be sanitised, decontaminated, deodorised and the like, including by employing ozone, chemicals radiation and the like, so as to be fit for resale. For example, the foam may be utilised for the purposes of underfloor cushion or the like. Where the foam or other material is ill suited for reuse, such may be employed for the purposes of energy generation and therefore sent for incineration.

Interpretation

Wireless:

The invention may be embodied using devices conforming to other network standards and for other applications, including, for example other WLAN standards and other wireless standards. Applications that can be accommodated include IEEE 802.11 wireless LANs and links, and wireless Ethernet.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. In the context of this document, the term "wired" and its derivatives may be used to describe circuits, devices, systems, methods, techniques, communications channels, etc., that may communicate data through the use of modulated electromagnetic radiation through a solid medium. The term does not imply that the associated devices are coupled by electrically conductive wires.

Processes:

Unless specifically stated otherwise, as apparent from the following discussions, it is appreciated that throughout the specification discussions utilizing terms such as "processing", "computing", "calculating", "determining", "analysing" or the like, refer to the action and/or processes of a computer or computing system, or similar electronic computing device, that manipulate and/or transform data represented as physical, such as electronic, quantities into other data similarly represented as physical quantities.

Processor:

In a similar manner, the term "processor" may refer to any device or portion of a device that processes electronic data, e.g., from registers and/or memory to transform that electronic data into other electronic data that, e.g., may be stored in registers and/or memory. A "computer" or a "computing device" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. The processing system further may include a memory subsystem including main RAM and/or a static RAM, and/or ROM.

Computer-Readable Medium:

Furthermore, a computer-readable carrier medium may form, or be included in a computer program product. A computer program product can be stored on a computer usable carrier medium, the computer program product comprising a computer readable program means for causing a processor to perform a method as described herein.

Networked or Multiple Processors:

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Additional Embodiments

Thus, one embodiment of each of the methods described herein is in the form of a computer-readable carrier medium carrying a set of instructions, e.g., a computer program that are for execution on one or more processors. Thus, as will be appreciated by those skilled in the art, embodiments of the present invention may be embodied as a method, an apparatus such as a special purpose apparatus, an apparatus such as a data processing system, or a computer-readable carrier medium. The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. furthermore, the present invention may take the form of carrier medium (e.g., a computer program product on a computer-readable storage medium) carrying computer-readable program code embodied in the medium.

Carrier Medium:

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media.

Implementation:

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Means for Carrying Out a Method or Function

Furthermore, some of the embodiments are described herein as a method or combination of elements of a method that can be implemented by a processor of a processor device, computer system, or by other means of carrying out the function. Thus, a processor with the necessary instructions for carrying out such a method or element of a method forms a means for carrying out the method or element of a method. furthermore, an element described herein of an apparatus embodiment is an example of a means for carrying out the function performed by the element for the purpose of carrying out the invention.

Connected

Similarly, it is to be noticed that the term connected, when used in the claims, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the recycling industries.

The invention claimed is:

1. A method for processing a contaminated mattress, the method comprising:
   compressing the contaminated mattress into a compressed state, wherein the contaminated mattress comprises one or more contaminants and the one or more contaminants comprise at least one pathogen;
   inserting the contaminated mattress in the compressed state in a bag and sealing the bag;
   deconstructing the contaminated mattress using high-pressure water jets; and
   recovering recyclable materials from the deconstructed contaminated mattress.

2. The method as claimed in claim 1, wherein the contaminated mattress is compressed at least by a factor of 5.

3. The method as claimed in claim 1, wherein the contaminated mattress is compressed at least by a factor of 10.

4. The method as claimed in claim 1, wherein the bag is sealed with an airtight seal.

5. The method as claimed in claim 1, wherein the contaminated mattress is maintained in the compressed state via strapping.

6. The method as claimed in claim 1, wherein the compressing comprises applying a compressive force to the contaminated mattress using a mechanical actuator.

7. The method as claimed in claim 6, wherein the mechanical actuator comprises a press plate.

8. The method as claimed in claim 6, wherein the mechanical actuator comprises hydraulic rams.

9. The method as claimed in claim 6, wherein the mechanical actuator is adapted to apply a predetermined amount of pressure.

10. The method as claimed in claim 6, wherein the mechanical actuator is controlled in accordance with at least one characteristic property of the contaminated mattress.

11. The method as claimed in claim 10, wherein the at least one characteristic property comprises at least one dimension of the contaminated mattress.

12. The method as claimed in claim 1, wherein the compressing comprises creating a pressure differential.

13. The method as claimed in claim 12, wherein the creating the pressure differential comprises creating a vacuum.

14. The method as claimed in claim 1, wherein the contaminated mattress further comprises water and the method further comprising dewatering the contaminated mattress wherein at least some of any water within the contaminated mattress is removed.

15. The method as claimed in claim 14, wherein the dewatering comprises squeezing.

16. The method of claim 1, further comprising transporting the contaminated mattress from a compression location to a deconstruction location.

17. The method of claim 1, wherein the deconstructing of the contaminated mattress comprises deconstructing the contaminated mattress and the bag together.

18. The method of claim 1, further comprising testing integrity of the contaminated mattress prior to compressing the contaminated mattress.

19. The method of claim 18, wherein the testing integrity of the contaminated mattress comprises testing at least one dimension, water content, internal structure, mattress type, visual characteristics and contaminants.

* * * * *